(12) United States Patent
Reddi et al.

(10) Patent No.: US 11,410,402 B2
(45) Date of Patent: Aug. 9, 2022

(54) COMPUTER-IMPLEMENTED METHOD FOR MAKING A SKELETON OF A MODELED BODY TAKE A POSTURE

(71) Applicant: DASSAULT SYSTEMES, Velizy Villacoublay (FR)

(72) Inventors: Sarath Reddi, Bengaluru (IN); Pinghan Chen, Velizy Villacoublay (FR)

(73) Assignee: DASSAULT SYSTEMES, Velizy Vilacoublay (FR)

( * ) Notice: Subject to any disclaimer, the term of this patent is extended or adjusted under 35 U.S.C. 154(b) by 0 days.

(21) Appl. No.: 17/070,875

(22) Filed: Oct. 14, 2020

(65) Prior Publication Data

US 2021/0118241 A1    Apr. 22, 2021

(30) Foreign Application Priority Data

Oct. 21, 2019 (EP) .................................... 19306366

(51) Int. Cl.
| | |
|---|---|
| *G06T 17/00* | (2006.01) |
| *G06T 19/20* | (2011.01) |
| *G06F 3/01* | (2006.01) |

(52) U.S. Cl.
CPC .............. *G06T 19/20* (2013.01); *G06F 3/011* (2013.01); *G06T 17/00* (2013.01); *G06T 2200/24* (2013.01); *G06T 2219/2016* (2013.01)

(58) Field of Classification Search
CPC ..... G06T 19/20; G06T 17/00; G06T 2200/24; G06T 2219/2016; G06T 13/40; G06T 7/251; G06T 13/00; G06T 7/35; G06T 2207/30196; G06T 7/75; G06T 7/20; G06F 3/011; G06F 3/0346; G06F 3/04815;
(Continued)

(56) References Cited

U.S. PATENT DOCUMENTS

| 9,508,177 B2 | 11/2016 | Kawakami et al. |
| 9,747,717 B2 | 8/2017 | Fleishman et al. |

(Continued)

OTHER PUBLICATIONS

Extended Search Report dated Feb. 25, 2020 in Europe Patent Application No. 19306366.6-1230, 16 pgs.
(Continued)

*Primary Examiner* — Xilin Guo
(74) *Attorney, Agent, or Firm* — Oblon, McClelland, Maier & Neustadt, L.L.P.

(57) ABSTRACT

A computer-implemented method for making a skeleton of a modeled human or animal body take a posture, including obtaining a first and a second skeleton each comprising rotational joints connected by bones, each rotational joint of the second skeleton being associated to a respective joint of the first skeleton, determining a relative configuration of the second skeleton, mapping each joint of the first skeleton to a joint of the second skeleton, making the first skeleton take a posture defined by a rotational state for each joint of the first skeleton, and computing transformation matrices for the joints of the second skeleton such that a change is minimized, said second skeleton further including a prismatic joint on at least one of its bones, and determining rotations of the rotational joints and translation of the prismatic joint or joints of the second skeleton such that change is minimized.

16 Claims, 4 Drawing Sheets

(58) Field of Classification Search
CPC ... A61B 5/4528; A61B 5/4509; A61B 5/4585; A61B 5/6878
See application file for complete search history.

(56) References Cited

U.S. PATENT DOCUMENTS

| | | | | |
|---|---|---|---|---|
| 2013/0141431 | A1* | 6/2013 | Kawakami | G06T 13/40 345/419 |
| 2018/0165864 | A1* | 6/2018 | Jin | G06T 17/005 |
| 2020/0005670 | A1* | 1/2020 | Iwao | G06T 13/40 |
| 2021/0118170 | A1* | 4/2021 | Fujii | G06T 7/75 |

OTHER PUBLICATIONS

Jean-Sebastien Monzani, et al.; "Using an Intermediate Skeleton and Inverse Kinematics for Motion Retargeting"; Computer Graphics Laboratory, Swiss Federal Institute of Technology, Lausanne, Swiizerland; XP-002503420; Proceedings of the Eurographics Conference ; Aug. 20, 2000; vol. 19 (2000), No. 3; 10 pgs.

Xi Chen, et al.; "Sequence Alignment for RGB-D and Motion Capture Skeletons"; Image Analysis and Recognition, Springer Berlin Heidelberg, Jun. 26, 2013; XP047031368; ISBN: 978-3-642-39093-7; 10 pgs.

Andrew Feng, et al.; "Fast. Automatic Character Animation Pipelines"; Computer Animation and Virtual Worlds; vol. 25, No. 1; Jan. 1, 2014; XP055667996; ISN: 1546-4261; 14 pgs.

Karim Abdel-Malek, et al.; "Towards a New Generation of Virtual Humans"; International Journal of Human Factors Modelling and Simulation; Jan. 1, 2006: XP055668545; Retrieved from the Internet: URL:https://pdfs.semanticsscholar.org/601f/4265938c3b1b243be648e6c04976459a93c.pdf; [retrieved on Jan. 1, 2010]; 38 pgs.

Leyde Briceno, et al.; "MakeHuman: A Review of the Modelling Framework: vol. V: Human Simulation and Virtual Environments, Work with Computing Systems (WWCS), Process Control"; Advances in Intelligent Systems and Computing; AISC; Aug. 7, 2018; Springer, Berlin; XP055668753; ISSN: 2194-5357; vol. 822, 12 pgs.

* cited by examiner

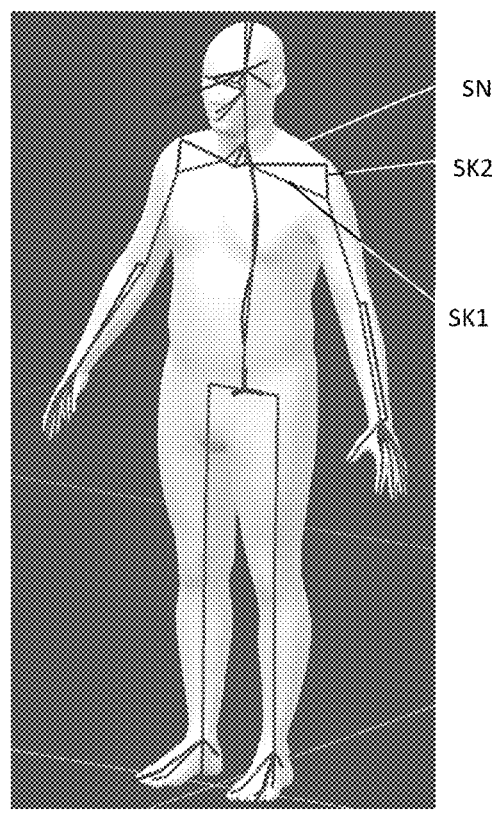
Fig. 1
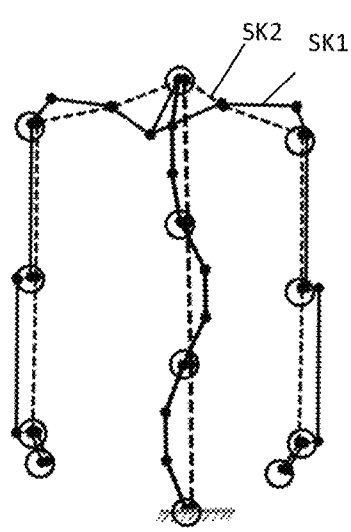 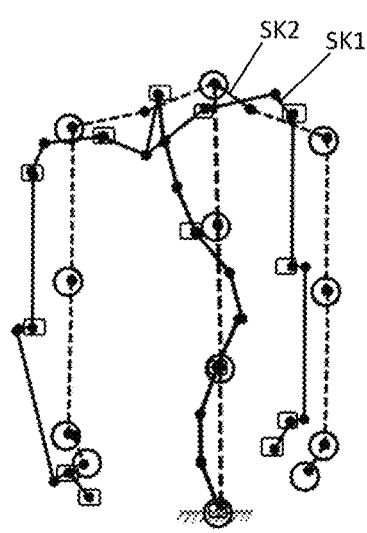 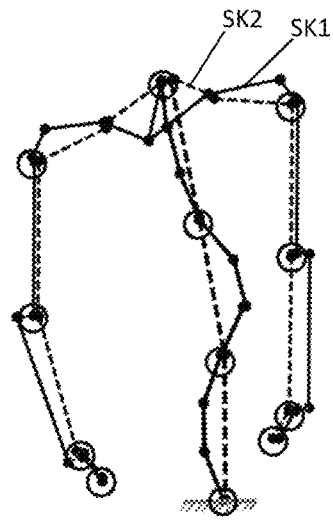
Fig. 2A        Fig. 2B        Fig. 2C

COMPUTER-IMPLEMENTED METHOD FOR MAKING A SKELETON OF A MODELED BODY TAKE A POSTURE

CROSS-REFERENCE TO RELATED APPLICATIONS

This application claims priority under 35 U.S.C. § 119 or 365 to European Application No. 19306366.6, filed Oct. 21, 2019. The entire contents of the above application(s) are incorporated herein by reference.

FIELD

The disclosure relates to a computer-implemented method for making a skeleton of a modeled human or animal body take a posture. More precise, it relates to a method for transferring or "retargeting" a pose taken by a first ("source") skeleton to another ("target") skeleton.

It relates to the field of computer graphics and it lends itself to several applications such as Computer Aided Design (CAD), ergonomics, video games, etc.

BACKGROUND

Digital Human Models (DHMs), as part of CAD systems, are being used extensively for design evaluations and incorporating human factors in the early stages of design.

A DHM usually comprises a "skeleton" covered by a "skin", even if in some cases it may consist of the skeleton alone. The skeleton is constituted by a set of segments, called "bones" even if they do not necessarily correspond to actual anatomical bones, articulated by rotational joints having one, two or three rotational degrees of freedom. Such models, also known as "avatars", are usually provided in standard postures, such as the so-called "T-pose" (partially spread legs, arms extended horizontally) for human body models. See for instance [Abdel-Malek 2006].

In order to make the avatar take a particular posture different from the original one, it is necessary to determine a set of rotations of the joints articulating the bones of its skeleton leading to the desired result. From a theoretical standpoint, this corresponds to the problem of inverse kinematics (IK). Several algorithms exist for solving this problem.

Despite the long history of DHM applications, the lack of proper standardization results in a variety of application-specific models, emulating human postures and movements with varying degrees of accuracy. Several DHMs are then commercially available with diverse capabilities and performances; some emphasize anthropometry and linkage structure accuracy, while others are good at posture/motion modeling and biomechanics, and others stresses behavioral and cognitive aspects.

The co-existence of multiple skeleton definitions is detrimental as it leads to non-digital continuity between different applications of DHM.

SUMMARY

The disclosure aims at overcoming the aforementioned drawbacks of the background art.

According to an aspect, as different skeletons may be optimized for different applications, a DHM having two or more skeletons—possibly associated to a single skin SN—is provided. For instance, a first skeleton may be a complex and biologically accurate skeleton, useful e.g. for performing ergonomic analysis, and a second skeleton of the DHM may then be much simpler, achieving a better compromise between complexity and accuracies for real-time animations.

According to another aspect, postures are mapped from one skeleton to another, in order to maintain posture synchronization between two different skeletons. This will be called hereafter "retargeting". Retargeting is known by itself, but it is usually applied to skeletons belonging to different DHM.

According to yet another object, at least one of the skeletons of the DHM (intended to be used as a target of the retargeting operation) is provided with prismatic joints on some or all of its bones. Bones provided with a prismatic joint have a variable length. The additional degree of freedoms provided by the prismatic joints allow ensuring a perfect or near-perfect retargeting even when the target skeleton has substantially less rotational joints than the source skeleton. This, in turns, allows the retargeting process to be done accurately and at a low computational cost.

The disclosure is not limited to the case of multi-skeleton DHM; for instance it may be used for transferring a pose from a first skeleton, belonging to (or constituting a) first DHM to a second skeleton belonging to (or constituting a) second DHM. Otherwise stated, the first aspect of the disclosure, mentioned above, is not essential.

The disclosure is not even limited to digital human models: it applies to any modeled human or animal body comprising at least one skeleton suitable to be retargeted to another skeleton, belonging to the model or not.

An object that allows achieving this aim is then a computer-implemented method for a computer-implemented method for making a skeleton of a modeled human or animal body taking a posture, comprising the steps of:

a) providing a first skeleton and a second skeleton of at least one digital body model, each of said first and second skeleton comprising a plurality of rotational joints connected by bones, the first skeleton having a greater number of rotational joints than the second skeleton, each rotational joint of the second skeleton being associated to a respective joint of the first skeleton;

b) determining a relative configuration of the second skeleton, said relative configuration mapping each joint of the first skeleton associated to a joint of the second skeleton to said joint of the second skeleton;

c) based on one or more inputs from a user, making the first skeleton taking a posture defined by a rotational state for each joint of the first skeleton; and d) computing transformation matrices for the joints of the second skeletons such that its relative configuration remains unchanged;

wherein said second skeleton further comprises a prismatic joint on at least one of its bones, step d) comprising determining rotations of the rotational joints and translation of the prismatic joint or joints of the second skeleton such that the change of its relative configuration is minimized.

Another object is a computer program product, stored on a non-transitory computer-readable data-storage medium, comprising computer-executable instructions to cause a computer system to carry out such a method.

Yet another object is a non-transitory computer-readable data-storage medium containing computer-executable instructions to cause a computer system to carry out such a method.

Yet another object is a computer system comprising a processor coupled to a memory and a graphical user interface, the memory storing computer-executable instructions to cause the computer system to carry out such a method.

A further object is a digital body model comprising a first skeleton and a second skeleton, each of said first and second skeleton comprising a plurality of rotational joints connected by bones, the first skeleton having a greater number of rotational joints than the second skeleton, each rotational joint of the second skeleton being associated to a respective joint of the first skeleton, wherein said second skeleton further comprises a prismatic joint on at least one of its bones.

BRIEF DESCRIPTION OF THE DRAWINGS

Additional features and advantages of the present disclosure will become apparent from the subsequent description, taken in conjunction with the accompanying drawings, wherein:

FIG. 1 represents a digital body model comprising a first ("source") skeleton, a second ("target") skeleton and a skin;

FIGS. 2A, 2B and 2C represent, respectively, a source and a target skeleton in their initial ("zero") pose, the source skeleton taking a different pose and the "retargeting" of the target skeleton;

DETAILED DESCRIPTION

Figure 3A:
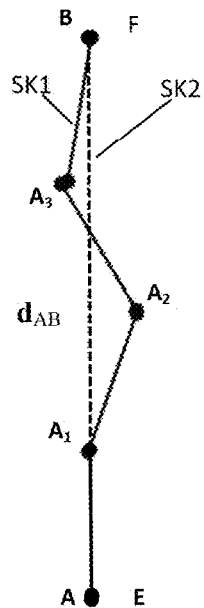
FIGS. 3A, 3B, 3C, 3D, 3E and 3F and FIG. 4 illustrate different steps of a method according to an embodiment.
Figure 3B:
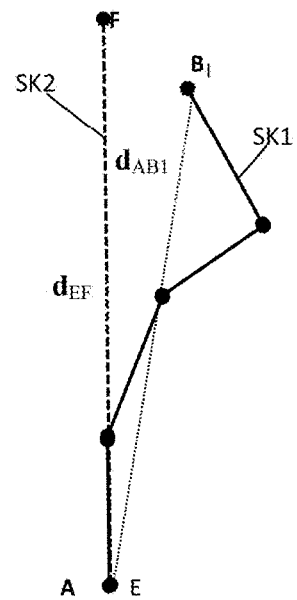

FIG. 1 represents an exemplary DHM having two skeletons SK1, SK2 associated to a single skin SN. In this exemplary embodiment, skeleton SK1 is be a complex and biologically accurate skeleton, including a large number of rotational joints; such a skeleton is useful e.g. for performing ergonomic analysis, but it is too complex for real-time animation applications. Skeleton SK2 is much simpler (it comprises a smaller number of joints) and achieves a good compromise between complexity and accuracies for real-time animations, but it would be too coarse for ergonomic analysis. Human modeling artists are involved in construction of the simple skeleton SK2 and the related skin to produce plausible skin deformations corresponding to different postures of SK2.

FIGS. 2A-2C illustrate the retargeting operation between SK1 and SK2.

FIG. 2A show portions of skeleton SK1 and SK2, corresponding to the upper body of the DHM, in their initial or "zero" pose. The rotational joints of SK2 are highlighted by circles. Each joint of SK2 is exactly or at least approximately superposed to a corresponding joint of SK1, but the converse is not true, given that SK1 comprises a greater number of joints.

In FIG. 2B, skeleton SK1 (acting as a "source" skeleton) has taken a different pose, while SK2 has remained still. It can be seen that the joints of SK1 corresponding to the joints of SK2 (highlighted by a rectangular box) are no longer superposed to the latter.

FIG. 2C shows the result of a retargeting operation: "target" skeleton SK2 has taken a new pose matching that of SK1; corresponding joints of the two skeletons are again almost superposed.

A posture is defined by a configuration of the kinematic structure—i.e. a mathematical representation—of the linkage structure formed by the bones and joints of a skeleton.

As each skeleton has its own topology defining its kinematics structure, retargeting is a complex problem, particularly when it is required to transfer a posture from a complex source skeleton to a simple target one (the case considered above, with reference to FIGS. 2A-2C). Indeed, as a reduced number of joints implies a smaller possible posture space, mapping from a complex skeleton to a simple one necessarily involves a loss of information, and possible mapping cannot always be achieved (a careful comparison of FIGS. 2A and 2C shows that the relative positions of some joints of the two skeletons has slightly changed, this is particularly visible on the left sides of the figures).

The two skeletons—SK1 and SK2—are defined independently and therefore, beside a different number of bones and joints, they may also have different kinds of joints with different degrees of freedom (DOF), different coordinate frames. These differences translate into different global transformation matrices, which define the position and orientation of each joint in a global coordinate frame for a given skeleton.

The first step of the inventive method includes identifying corresponding joints on the two skeletons. If we consider that the target skeleton SK2 has fewer joints than the source skeleton SK1, this includes identifying a subset of joints of SK1 corresponding to respective joints of SK2. This has already been discussed with reference to FIGS. 2A-2C. In the highly simplified example of FIGS. 3A-3F (see in particular 3A), the source skeleton SK1 has five joints, labeled A, A1, A2, A3 and B, while the target skeleton has two joints, E and F. Joints A and B of SK1 are associated to joints E and F, respectively; joints A1, A2 and A3 are not associated to any joint of SK2. The association may be performed manually, e.g. by the designer of a multi-skeleton DHM, or automatically, e.g. by automatically identifying the joint of SK1 which is closest to any one of the joints of SK2 when both skeletons are in their initial, or "zero", pose.

Then, the relative transformation matrix of each joint of SK1 (e.g. joint B) with respect to the corresponding joint of SK2 (e.g. joint F) is computed. Let $T_B$ the initial transformation matrix of joint B, expressing its position and orientation with respect to a point serving as a global origin, or root:

$$T_B = \begin{bmatrix} R_B & P_B \\ 0 & 1 \end{bmatrix}$$

where $R_B$ is a 3×3 rotation matrix, $P_B$ a 3×1 (column) translation vector, 0 a 1×3 (line) vector whose elements are all zero an 1 a scalar. Similarly, $$T_F = \begin{bmatrix} R_F & P_F \\ 0 & 1 \end{bmatrix}$$

The configuration of each skeleton is defined by the transformation matrices of all its joints.

The (initial) relative transformation matrix of joint F with respect to B, $T_B^F$, is then given by:

$$T_B^F = T_F^{-1} T_B$$

where "$-1$" denotes matrix inversion.

In the example of FIG. 3A, joints B and F coincide and have a same orientation, i.e. $T_B^F = 1$, where 1 designates a 4×4 unit matrix, but this is not necessarily true.

The relative configuration of the source skeleton SK1 is defined by the relative transformation matrices of all its joints.

When the pose of the source skeleton SK1 changes, joint B takes a different configuration (position and/or orientation along three rotation axes), which will be designated by B1 (see FIG. 3B) and described by a different transformation matrix $T_{B1}$. Retargeting, or posture synchronization, includes finding a new configuration F1 for joint F, described by transformation matrix $T_{F1}$ such that $$T_{B1}^{F1} = T_{F1}^{-1} T_{B1} = T_B^F$$

i.e. such that the relative transformation between the corresponding joints is unchanged. This applies for all joints of SK2, in such a way that its relative configuration with respect to SK1 (defined by the set of relative configurations of all its joints) remains unchanged.

Let the distance between A and B be $d_{AB}$, which is equal to the norm of $P_B^A$. Similarly, let the distance between A and B1 be $d_{AB1}$ which is equal to the norm of $P_{B1}^A$. On the target skeleton, let the distance between E and F be $d_{EF}$ which is the length of the EF bone and is equal to the norm of $P_F^E$.

Figure 3C:
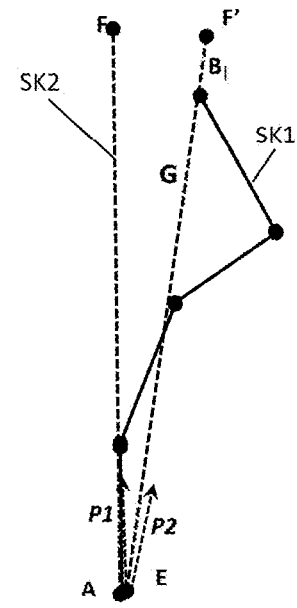
Figure 3D:
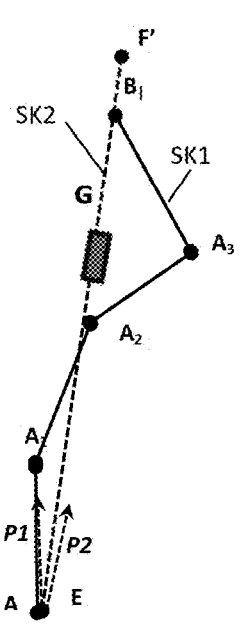
Figure 3E:
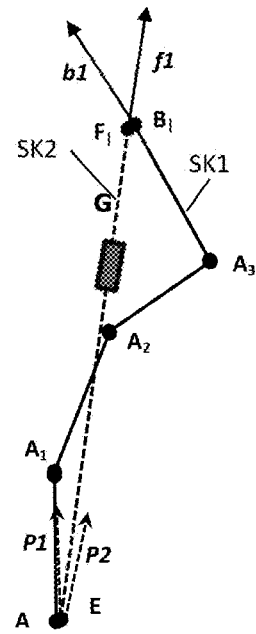
Figure 3F:
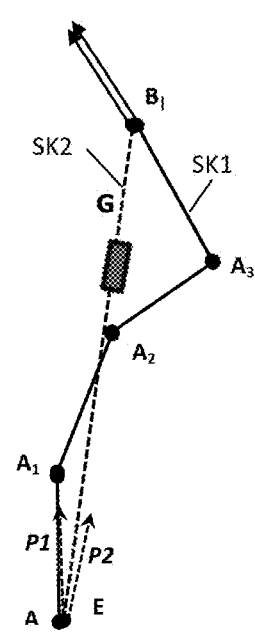
Figure 4:
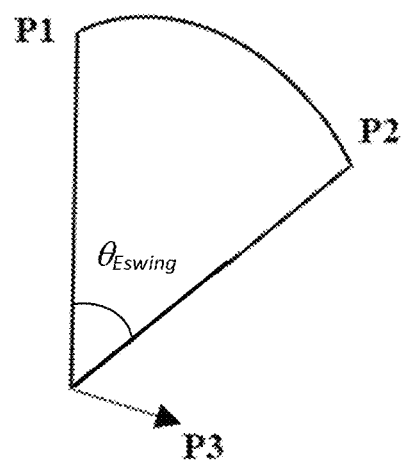

The compensatory movement to displace the joint F to match the position of B1 can be achieved only by using joint E. Let the unit vectors of EF and EB1 be P1 and P2 (see FIG. 3C), whose values can be computed from $T_F$ and $T_{B1}$. Let $\theta_{Eswing}$ be the angle between P1, P2 and let P3 be the unit vector normal to P1 and P2 (see FIG. 4). These parameters can all be determined from the transformation matrices. If joint E is rotated about axis P3 with magnitude $\theta_{Eswing}$, then joint F reaches location F'. However, in general, $T_{B1}^{F'} \neq T_B^F$ because the distance between E and F', $d_{EF'}$ is different from $d_{AB1}$. Indeed, a comparison of FIGS. 3A and 3C shows that while B and F coincide, B1 and F' do not.

Therefore, rotating the joints of the target skeleton SK2 is not sufficient, in general, to achieve perfect posture synchronization between SK1 and SK2. And indeed, in the prior art, retargeting often fails to achieve an exact posture synchronization between skeletons, and only allows to minimize an error in relative configuration change.

According to the disclosure, this problem is solved by providing bone EF with a prismatic joint G (see FIG. 3D) which allows changing its length. By acting on both rotational joint E (which undergoes a rotation by angle $\theta_{Eswing}$ about axis P3) and prismatic joint G (which undergoes a translation of magnitude $d_{EF} - d_{AB1}$) it is possible to displace point F to a position F1 coinciding with that of B1, as shown on FIG. 3E.

From a formal point of view, the transformation of F to F1 corresponds to a transformation matrix $$T_{Enew} = \begin{bmatrix} R_{\theta_{Eswing}} & P_{B1}^E \\ 0 & 1 \end{bmatrix}$$

where $R_{\theta_{Eswing}}$ is the rotation matrix for a rotation by $\theta_{Eswing}$ about axis P3 and $P_{B1}^E = P2(d_{EF} - d_{AB})$.

This matrix is appended (i.e. post-multiplied) to the global matrix $T_E$ to obtain global $T_{Enew}^0$. When $T_{Enew}^0$ is applied (i.e. pre-multiplied) to the local transformation of F with respect to E, the joint F gets transformed to F1 (which is the same as B1), thus achieving the position matching using only two DOF, with a twist DOF remaining unused.

However, matching the position of joint F with B1 is not a sufficient condition for posture mapping. Joint F also needs to be re oriented in order to ensure that the condition $T_{B1}^{F1} = T_B^F$ is satisfied. Indeed, when joint F takes its position F1 matching position B1 of joint B, the unit vectors f1 and b1 which connect these joints to the successive branch of the structure may be oriented in different directions as shown in the FIG. 3E. An additional rotation $R_{\phi_{Fswing}}$ and additional transformation matrix $T_{\phi_{Fswing}}$ can be computed to match the unit vector f1 with b1 as shown on FIG. 3F using the same approach discussed above with reference to FIG. 3C.

Moreover, in three dimensions it is also necessary to account for the existence of a twist component $T_{\phi_{Fswing}}$ of the transformation matrix.

But matching these two unit vectors will not necessarily satisfy the initial relative configuration constraint (equation 3) because of existence of twist component $T_{\phi_{Ftwist}}$. Therefore its essential to determine the twist component required to satisfy the constraint.

$T_B$ and $T_{B1}$ are the initial and final global transformations of the joint B. Similarly $T_F$, $T_{F1}$ are the initial and final global transformations of joint F. The initial relative configuration of joints B and F is given by $T_B^F = T_F^{-1} T_B$ and since it needs to be preserved at all posture variations, it also applies to the final configurations:

$$T_{F1} = T_{B1} T_B^F$$

$T_{F1}$ is combination of two components $T_{\phi_{Fswing}}$ and $T_{\phi_{Ftwist}}$: $T_{F1} = T_{\phi_{Fswing}} T_{\phi_{Ftwist}}$ where $T_{\phi_{Fswing}}$ is easily found from vectors f1 and b1.

Therefore:

$$T_{\phi_{Ftwist}} = T_{\phi_{Fswing}}^{-1} T_{F1} = F_{swing}^{-1} T_{F1} = T_{\phi_{Fswing}}^{-1} T_{B1} T_B^F$$

At this point, the three transformation matrices $T_{Enew}$, $T_{\phi_{Fswing}}$ and $T_{\phi_{Ftwist}}$ allow computing the new configuration of joint F. It should be noted that, out of the seven DOF available, six are used to achieve posture synchronization. One DOF (twist parameter) is left at joint E and can be used to address the issues like joint ranges of motion at the joint F and possible distortions of the skin deformation which is attached the link EF. Indeed, in most practical cases it is required that the whole process of retargeting is carried out without disturbing the visual appearance of the skin. In these cases it's not enough to get exact solution for retargeting but also the appearance of the skin should be kept intact without distortions. The "modular" retargeting procedure described above, treating one bone at a time, allows isolation of one DOF to deal with additional constraints. In particular, this DOF can be used to preserve the natural appearance of the skin. Additionally, in some cases, the retargeting solution may drive some joints out of their allowed motion range; in this scenario, the remaining DOF can be used to ensure that the retargeting solutions respects the constraints on the joint positions and orientations.

The same procedure is applied step by step to all the joints of SK2, starting from a root node till the end effectors.

The inventive method can be performed by a suitably-programmed general-purpose computer or computer system, possibly including a computer network, storing a suitable program in non-transitory form on a computer-readable medium such as a hard disk, a solid state disk or a CD-ROM and executing said program using its microprocessor(s) and memory.

Figure 5:
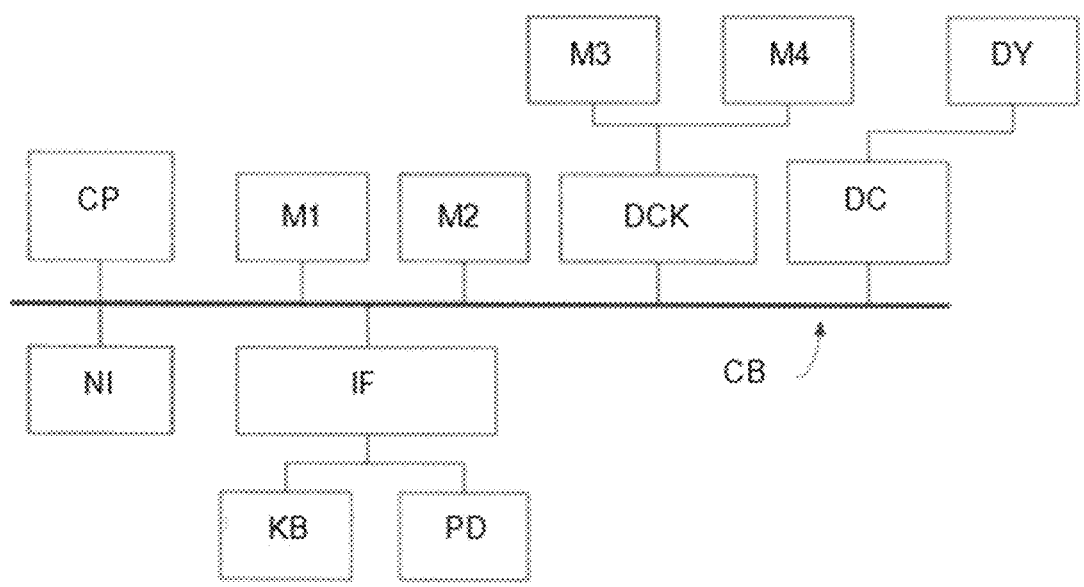
FIGS. 5 and 6 are block diagrams of respective computer systems suitable for carrying out a method according to different embodiments.

A computer suitable for carrying out a method according to an exemplary embodiment is described with reference to FIG. 5. In FIG. 5, the computer includes a Central Processing Unit CPU which performs the processes described above. The process can be stored as an executable program, i.e. a set of computer-readable instructions in memory, such as RAM M1 or ROM M2, or on hard disk drive (HDD) or solid-state driver (SDD) M3, DVD/CD drive M4, or can be stored remotely. Moreover, one or more computer files defining one or more digital body model and/or skeleton may also be stored on one or more of memory devices M1 to M4, or remotely.

The claimed invention is not limited by the form of the computer-readable media on which the computer-readable instructions and/or the digital files of the inventive process are stored. For example, the instructions and files can be stored on CDs, DVDs, in FLASH memory, RAM, ROM, PROM, EPROM, EEPROM, hard disk or any other information processing device with which the computer communicates, such as a server or another computer. The program and the files can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft Windows 10, UNIX, Solaris, LINUX, Apple MAC-OS and other systems known to those skilled in the art.

The Central Processing Unit CPU can be a Xenon processor from Intel of America or an Opteron processor from AMD of America, or can be other processor types, such as a Freescale ColdFire, IMX, or ARM processor from Freescale Corporation of America. Alternatively, the Central Processing Unit can be a processor such as a Core2 Duo from Intel Corporation of America, or can be implemented on an FPGA, ASIC, PLD or using discrete logic circuits, as one of ordinary skill in the art would recognize. Further, the Central Processing Unit can be implemented as multiple processors cooperatively working to perform the computer-readable instructions of the inventive processes described above.

The computer in FIG. 5 also includes a network interface NI, such as an Intel Ethernet PRO network interface card from Intel Corporation of America, for interfacing with a network, such as a local area network (LAN), wide area network (WAN), the Internet and the like. The Computer Aided Design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands—e.g. to move the target point, define parameters etc.—and by the Computer Aided Design station for displaying the three-dimensional scene including the avatar.

Disk controller DKC connects HDD M3 and DVD/CD M4 with communication bus CBS, which can be an ISA, EISA, VESA, PCI, or similar, for interconnecting all of the components of the Computer Aided Design station.

A description of the general features and functionality of the display, keyboard, pointing device, as well as the display controller, disk controller, network interface and I/O interface is omitted herein for brevity as these features are known.

Figure 6:
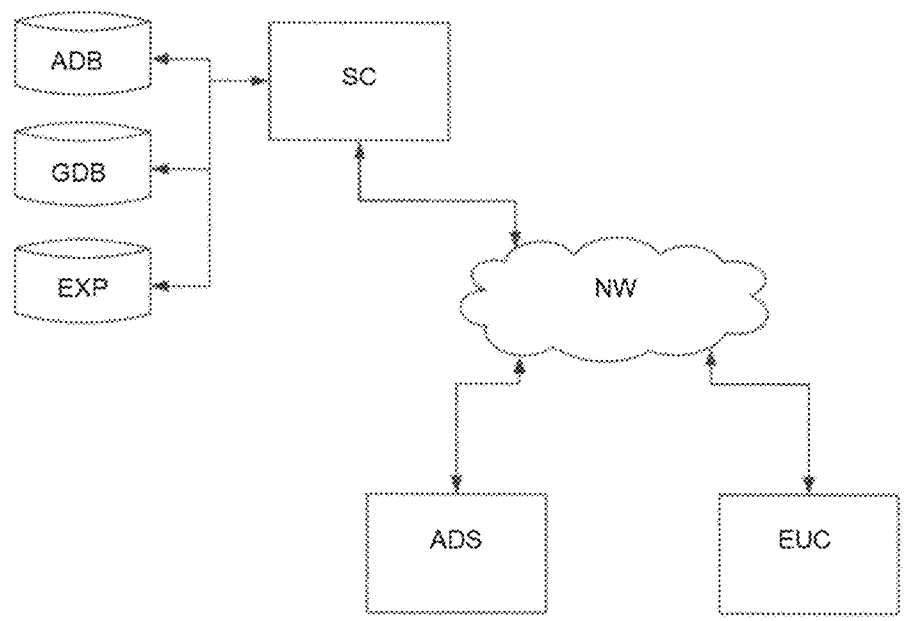

FIG. 6 is a block diagram of a computer system suitable for carrying out a method according to a different exemplary embodiment.

In FIG. 6, the executable program EXP and the computer file(s) defining the avatar(s) and possibly the three-dimensional scene are stored on memory devices connected to a server SC. The memory devices and the overall architecture of the server may be the same as discussed above with reference to FIG. 5, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 6, except that the memory devices of the administrator system and the end user computer do not store the executable program EXP and/or the computer file(s) defining the body model and/or skeleton(s). However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining body models and/or skeletons. The server performs the processing as described above, and transmits to the end user computer an image file corresponding to the desired representation of the body model(s) and/or skeleton(s), again using the network NW.

Although only one administrator system ADS and one end user system EUX are shown, the system can support any number of administrator systems and/or end user systems without limitation. Similarly, multiple servers can also be implemented in the system without departing from the scope of the present disclosure.

Any processes described herein should be understood as representing modules, segments, or portions of code which include one or more executable instructions for implementing specific logical functions or steps in the process, and alternate implementations are included within the scope of the exemplary embodiment.

REFERENCES

[Abdel-Malek 2006] Abdel-Malek, K., Yang, J., Marler, T., et al. (2006), "Towards a New Generation of Virtual Humans", International Journal of Human Factors Modeling and Simulation, 1, 1, 2-39.

The invention claimed is:

1. A computer-implemented method for making a skeleton of a modeled human or animal body takes a posture, comprising:
   a) obtaining a first skeleton and a second skeleton of at least one digital body model, each of said first skeleton and said second skeleton including a plurality of rotational joints connected by bones, the first skeleton having a greater number of rotational joints than the second skeleton, each rotational joint of the second skeleton being associated to a respective joint of the first skeleton:
- b) determining a relative configuration of the second skeleton, said relative configuration mapping each joint of the first skeleton, associated with a joint of the second skeleton, to said joint of the second skeleton;
- c) based on one or more inputs from a user, making the first skeleton take a posture defined by a rotational state for each joint of the first skeleton; and
- d) computing transformation matrices for the joints of the second skeleton such that a relative configuration of the second skeleton remains unchanged, wherein said second skeleton further includes a prismatic joint on at least one bone of the second skeleton, wherein step d) further includes determining rotations of the rotational joints and translation of the prismatic joint or joints of the second skeleton such that the relative configuration of the second skeleton remains unchanged, and wherein the first skeleton and the second skeleton belong to a same digital body model.

2. The method of claim 1, wherein the second skeleton includes a prismatic joint on all bones of the second skeleton.

3. The method of claim 1, wherein step d) further includes computing a transformation matrix for each joint of the second skeleton by considering said joints in succession, starting from a root joint.

4. The method of claim 1, wherein step a) further includes making the first and the second skeleton take respective initial postures.

5. The method of claim 1, further comprising:
- e) applying the computed transformation matrices to the joints of the second skeleton, making the second skeleton take a posture matching that of the first skeleton.

6. The method of claim 5, further comprising:
- f) displaying, on a computer screen, at least one of the second skeleton and of a skin associated with the second skeleton.

7. A non-transitory computer-readable data-storage medium containing computer-executable instructions that when executed by a computer system cause the computer system to carry out the method according to claim 1 for making the skeleton of the modeled human or animal body take the posture.

8. The non-transitory computer readable medium of claim 7, wherein the second skeleton includes a prismatic joint on all bones of the second skeleton.

9. The non-transitory computer readable medium of claim 7, wherein step d) further includes computing a transformation matrix for each joint of the second skeleton by considering said joints in succession, starting from a root joint.

10. The non-transitory computer readable medium of claim 7, wherein step a) further includes making the first and the second skeleton take respective initial postures.

11. The non-transitory computer readable medium of claim 7, wherein the method further comprises:
- e) applying the computed transformation matrices to the joints of the second skeleton, making the second skeleton take a posture matching that of the first skeleton.

12. The non-transitory computer readable medium of claim 11, wherein the method further comprises:
- f) displaying, on a computer screen, at least one of the second skeleton and of a skin associated with the second skeleton.

13. The non-transitory computer readable medium of claim 7, wherein the first skeleton and the second skeleton belong to a same digital body model.

14. A computer system comprising;
- a processor coupled to a memory and a graphical user interface, the memory storing computer-executable instructions that when executed by the processor cause the processor to be configured to
- obtain a first skeleton and a second skeleton of at least one digital body model, each of said first skeleton and said second skeleton including a plurality of rotational joints connected by bones, the first skeleton having a greater number of rotational joints than the second skeleton, each rotational joint of the second skeleton being associated to a respective joint of the first skeleton,
- determine a relative configuration of the second skeleton, said relative configuration mapping each joint of the first skeleton, associated with a joint of the second skeleton, to said joint of the second skeleton,
- make, based on one or more inputs from a user, the first skeleton take a posture defined by a rotational state for each joint of the first skeleton, and
- compute transformation matrices for the joints of the second skeleton such that a relative configuration of the second skeleton remains unchanged, wherein said second skeleton further includes a prismatic joint on at least one bone of the second skeleton, wherein the processor is further configured to determine the relative configuration of the second skeleton by being configured to determine rotations of the rotational joints and translation of the prismatic joint or joints of the second skeleton such that the relative configuration of the second skeleton remains unchanged, and wherein the first skeleton and the second skeleton belong to a same digital body model.

15. A digital body model comprising:
- a first skeleton and a second skeleton, each of said first and second skeleton comprising a plurality of rotational joints connected by bones, the first skeleton having a greater number of rotational joints than the second skeleton, each rotational joint of the second skeleton being associated to a respective joint of the first skeleton, wherein said second skeleton further comprises a prismatic joint on at least one bone of the second skeleton, and wherein the first skeleton and the second skeleton belong to a same digital body model.

16. The digital body model of claim 15, wherein the second skeleton includes a prismatic joint on all bones of the second skeleton.

* * * * *